No. 881,379.
PATENTED MAR. 10, 1908.
J. B. CRAPO.
PLOWSHARE.
APPLICATION FILED JULY 16, 1907.
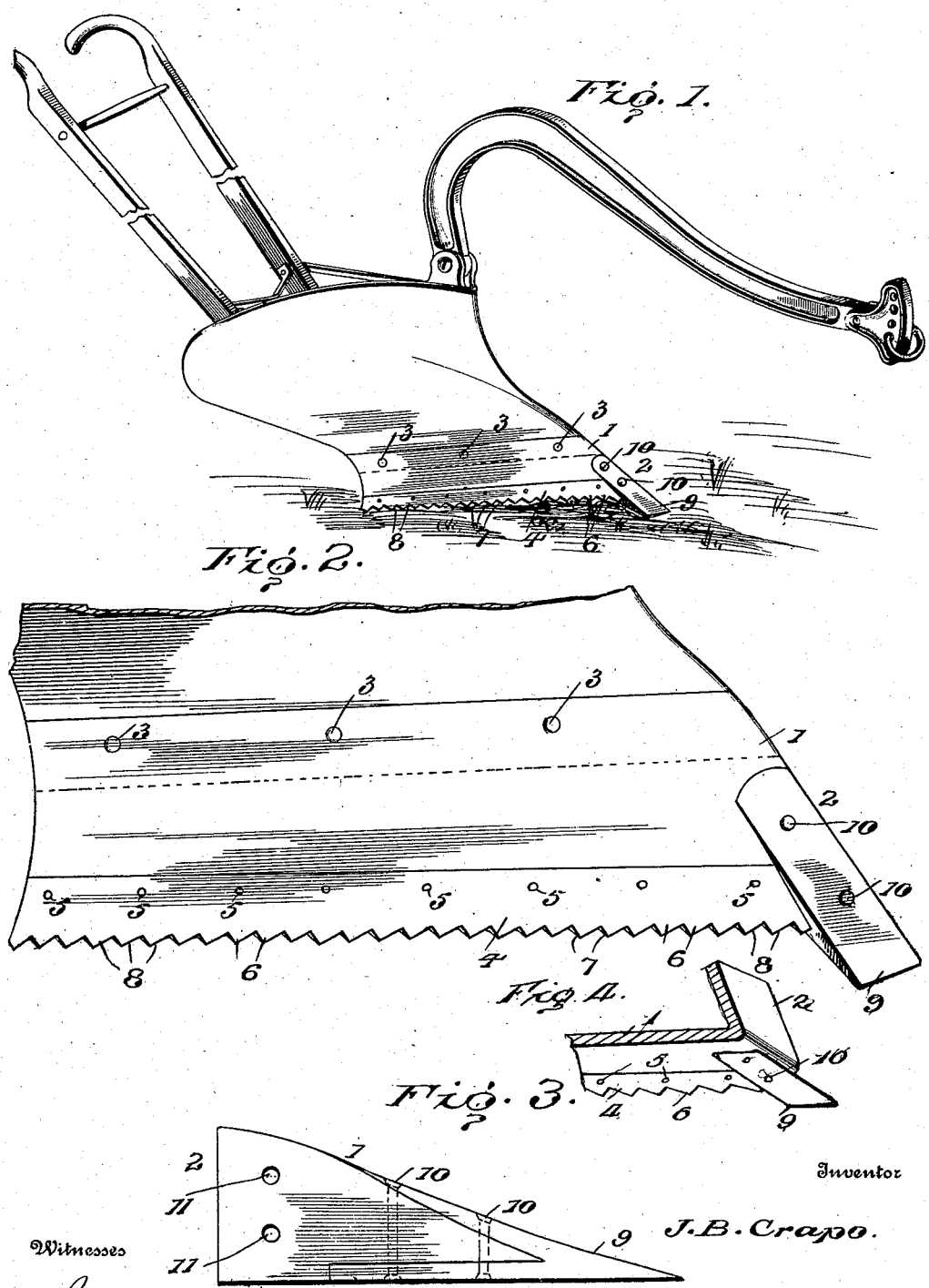
Inventor
J. B. Crapo.
Witnesses
By
Attorney

UNITED STATES PATENT OFFICE.

JOHN B. CRAPO, OF PARKER, IDAHO.

PLOWSHARE.

No. 881,379.   Specification of Letters Patent.   Patented March 10, 1908.

Application filed July 16, 1907. Serial No. 384,000.

*To all whom it may concern:*

Be it known that I, JOHN B. CRAPO, citizen of the United States, residing at Parker, in the county of Fremont and State of Idaho, have invented certain new and useful Improvements in Plowshares, of which the following is a specification.

The present invention relates to an improved plow share and aims to provide a novel device of this character which is so constructed as to be readily kept in perfect condition by a farmer without the annoyance and delay caused by taking the plow share to a blacksmith.

The object of the invention is to design a simple and inexpensive plow share in which the cutting portions have a peculiar construction and are detachably connected to the plow so as to be readily replaced when required.

For a full description of the invention and the merits thereof and also to acquire a knowledge of the details of construction and the means for effecting the result, reference is to be had to the following description and accompanying drawings, in which:

Figure 1 is a perspective view showing the application of the invention. Fig. 2 is an enlarged front view of the plow share, showing portions of the plow. Fig. 3 is a side elevation of the landside portion of the plow share.

Corresponding and like parts are referred to in the following description and indicated in all the views of the drawings by the same reference characters.

The plow share comprises the usual wings 1 and 2 arranged at angles to each other, the wing 1 being designed to form an extension for the moldboard while the wing 2 forms an extension for the land side, the wing 2 is pendent from the inner end of the wing 1 and forms a portion of the landside in the completed plow. A series of openings 3 are formed along the upper longitudinal edge of the wing 1 and are designed to receive the bolts or other fastening members by means of which the wing is secured to the moldboard of the plow. A blade 4 extends longitudinally along the lower edge of the wing 1 and is detachably secured in position by means of the rivets 5 or other suitable fastening members. The outer edge of the blade 4 is formed with a plurality of teeth 6 having the edges thereof sharpened to facilitate the formation of the furrow. One of the sides 7 of each of the teeth 6 has the same direction as the motion of the plow when the latter is in operation while the opposite side 8 of each of the teeth is disposed at an angle so as to sever roots or similar obstructions encountered by the plow. A removable point 9 is located at the junction of the wing 1 and the wing 2 and extends forward slightly in advance of the said members. The rear end of the point 9 is bifurcated and the lower arm is received within a corresponding recess in the lower edge of the wing 2 while the upper arm is secured to the upper portion of the wing 1. Bolts 10 or similar fastening means may be utilized for securing the point in position and the said bolts are shown as passing through the bifurcated end of the point. It may also be observed that the wing 2 is provided with openings 11 for receiving a bolt by means of which the same is secured in position in alinement with the land side of the plow.

Having thus described the invention, what is claimed as new is:

In a plow, the combination of a share of uniform width and having a pendent vertical landside wing at its inner end, a toothed blade fitted to the lower edge of the share, a moldboard attached to the upper edge of said share, and a forked point embracing the inner ends of the share, toothed blade and the pendent wing of said share and secured thereto.

In testimony whereof I affix my signature in presence of two witnesses.

JOHN B. CRAPO. [L. S.]

Witnesses:
JAMES A. CRAPO,
THEO. FRAME.